(No Model.)
J. REIGART.
Window-Screen.
No. 227,446.  Patented May 11, 1880.
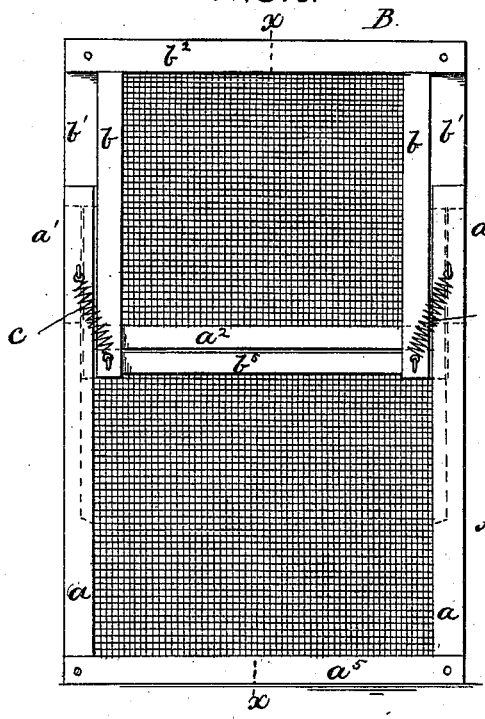
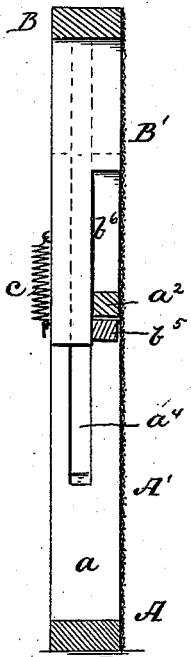
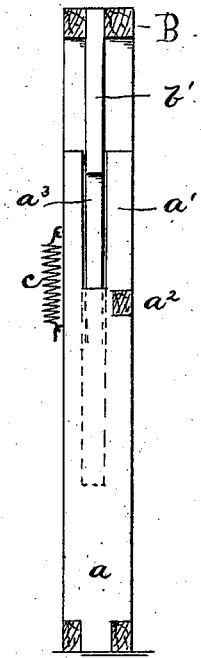
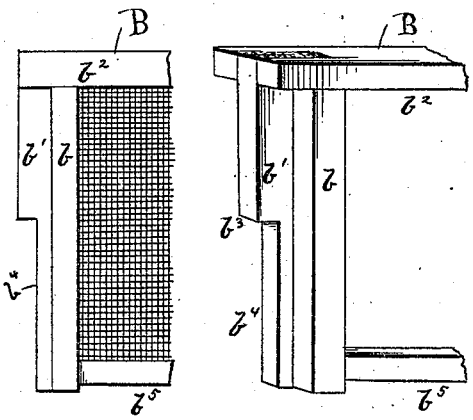
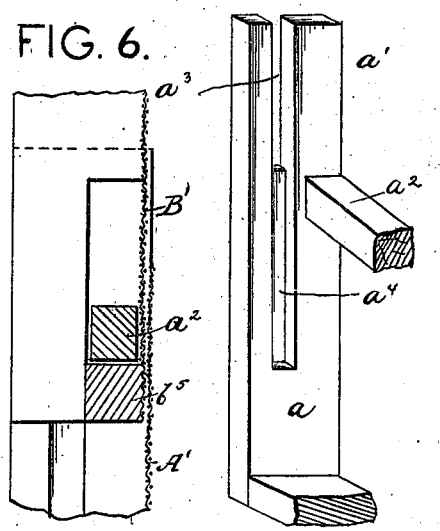
Witnesses:
Inventor:
Jacob Reigart
By R.S. & A.T. Lacey, Attys.

UNITED STATES PATENT OFFICE.

JACOB REIGART, OF STEELTON, PENNSYLVANIA.

WINDOW-SCREEN.

SPECIFICATION forming part of Letters Patent No. 227,446, dated May 11, 1880.

Application filed March 3, 1880. (No model.)

*To all whom it may concern:*

Be it known that I, JACOB REIGART, a citizen of the United States, residing at Steelton, in the county of Dauphin and State of Pennsylvania, have invented certain new and useful Improvements in Window-Screens; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has for its object to furnish a screen which will automatically adjust itself to any size of window.

It consists in the peculiar construction of the sliding frames and in a spring for operating them, all of which will be hereinafter fully described.

In the drawings, Figure 1 is a front elevation of a screen made according to my invention. Fig. 2 is a vertical section on line $x\,x$, Fig. 1. Fig. 3 is an edge elevation, and Figs. 4, 5, and 6 are detail views.

The screen is composed of two frames, A and B, each having a wire-cloth, A' B', respectively, fastened thereon. The frame A has the ends $a'\,a'$ of the side bars, $a\,a$, extended beyond the inner cross-bar, $a^2$, and have formed therein the longitudinal slots $a^3\,a^3$, which extend from the outer end to the said cross-bar $a^2$. On the inner faces of the side bars, $a\,a$, there are formed the channels or grooves $a^4\,a^4$, which are made long enough to permit the play of the two frames, as hereinafter explained. The wire-cloth A' is nailed fast to the side bars, $a\,a$, and to the outer end bar, $a^5$, but not to the cross-bar $a^2$, and stands out sufficiently to permit the cloth B' to slide between it and the said bar $a^2$.

The frame B has formed on the outer faces of its side bars, $b\,b$, the feathers $b'\,b'$, which extend outward to a line flush with the outer face of the side bars, $a$, of the frame A. The ends of the feathers $b'\,b'$ abut against the outer end bar, $b^2$, which projects beyond the side bars, $b$, and forms a stop or shoulder, as shown. The feathers fit and slide in the slots $a^3\,a^3$, and have their lower ends cut away, forming a shoulder, $b^3$, and an inner or smaller feather, $b^4$, which slides in the grooves or channels $a^4\,a^4$. The inner cross-bar, $b^5$, of the frame B and the inner cross-bar, $a^2$, of the frame A interlock in the manner shown and prevent the frames from coming apart.

The side bars, $b$, of the frame B are cut away, so as to form side openings or ways, $b^6$, between its lower ends, $b^7$, and its wire-cloth B'. The extent of the movements of the frames is determined by the length of this opening or way and the arrangement of the cross-bars $a^2\,b^5$ with reference thereto and the other parts hereinbefore described.

The ends of the cross-bar $a^2$ pass through the longitudinal opening $b^6$, and in the adjustments of the frames the said ends move back and forth in said openings.

The frame B is made narrower than frame A, so that it fits snugly between and slides against the inner sides of the side bars, $a\,a$.

The ends $b^7$ of the side bars, $b$, extend past the cross-bar $a^2$, so that the cross-bar $b^5$ is on the opposite or inner side of the cross-bar $a^2$, as shown.

By the construction and arrangement of the parts as hereinbefore described the two pieces of wire-cloth laid on the two frames A and B are arranged on the same side of the screen with their ends overlapped, forming substantially for all practical purposes a continuous wire web.

In the ordinary screens the two wire webs slide in different planes, being fixed on opposite sides of the screen, while in my device they slide the one against the other.

$c$ is a spring, of which there are two, by preference, having one end secured to the frame A and the other end secured to frame B. This spring is attached so that one or both ends may be unhooked, if desired. It is so formed and applied that it will cause the two frames to extend and adapt themselves to the width of the window.

The wire-cloth B' slides between the wire-cloth A' and the bar $a^2$. A close joint is made, through which no insects, however small, can pass.

The two frames, when joined together and provided with a spring, as described, will always adjust themselves, and there will be no locking or binding of one part on another, and the outer edges of the two frames will always maintain themselves in a straight line. I employ two springs, but it will be understood that one will be sufficient if made of sufficient strength. It will be further understood that the frames may be used without any spring, in which case they will have to be extended by the hands.

Having thus fully described my invention, what I claim as new, and desire to secure by Letters Patent, is—

1. In a window-screen composed of the adjustable sections or frames A and B, interlocked and sliding one upon the other, the wire webs A' and B', fixed on the adjustable frames and arranged on the same side of the screen, and having their ends interlapped and sliding one against the other, forming substantially a continuous wire web over the entire surface of the screen in any position of adjustment that may be given to the frames A and B, as set forth.

2. The improved window-screen composed of the adjustable frame A, having the extensions $a'$ $a'$ and slots $a^3$ and inner cross-bar, $a^2$, the adjustable frame B, sliding within the frame A, and having the lateral feathers $b'$, which project through the slots $a^3$, and the open mortises $b^6$, formed on the edges of the inner ends of the side bars, $b$, next the wire covering, and arranged to receive and slide over the ends of the cross-bar $a^2$, and the wire webs A' B', fixed to the frames A and B, covering the side mortises, $b^6$, and having their inner ends brought together and interlapped and sliding one against the other, and forming substantially a continuous wire covering for the screen in any position of adjustment given to the sections A and B, as set forth.

In testimony that I claim the foregoing I have hereunto set my hand this 1st day of March, 1880.

JACOB REIGART.

Witnesses:
H. J. BABB,
CHAS. H. BABB.